W. H. MANNING.
Combined Pie-Plate and Cutter.

No. 161,890. Patented April 13, 1875.

Witnesses,
W. J. Cambridge
Wm. Bronenstahl

Inventor,
Walter H. Manning
Per Teschemacher & Stearns
Attorneys.

UNITED STATES PATENT OFFICE.

WALTER H. MANNING, OF BOSTON, MASSACHUSETTS.

IMPROVEMENT IN COMBINED PIE PLATES AND CUTTERS.

Specification forming part of Letters Patent No. 161,890, dated April 13, 1875; application filed October 1, 1874.

*To all whom it may concern:*

Be it known that I, WALTER H. MANNING, of Boston, in the county of Suffolk and State of Massachusetts, have invented a Combined Plate for Baking Pies, Cakes, &c., and Cutter for removing the same therefrom, of which the following is a full, clear, and exact description, reference being had to the accompanying drawings, making part of this specification, in which—

Figure 1:
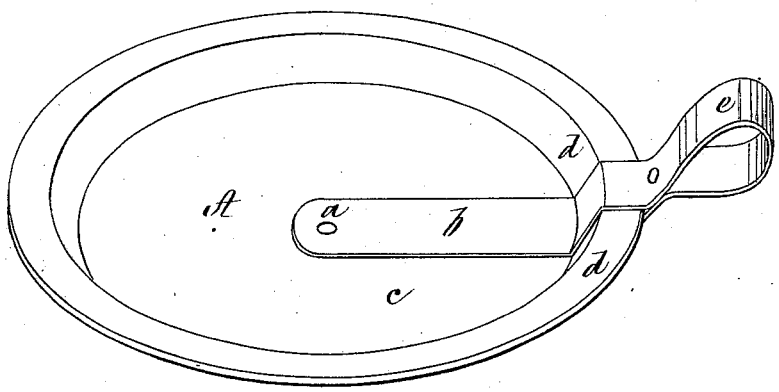
Figure 2:
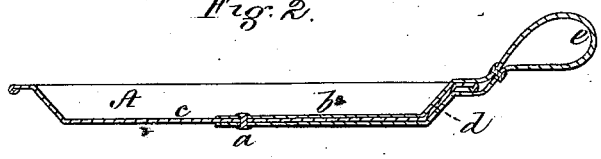
Figure 3:
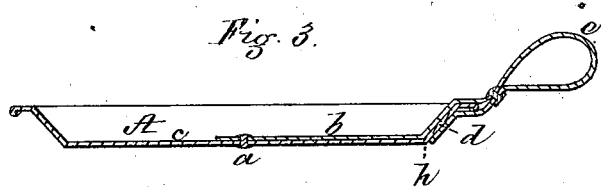

Figure 1 is a perspective view of a baking-plate with my cutter applied thereto. Fig. 2 is a central section through the same. Fig. 3, modification in section.

In baking pies, cakes, bread, &c., it is customary to rub the inside of the plate or pan with butter or lard in order that the bottom and sides or under crust of the article, when baked, may not adhere thereto. To dispense with the necessity of greasing the plate or pan, and to avoid the liability of any disagreeable or foreign taste being thereby imparted to the crust (a present serious objection) is the purpose of my invention, which consists in a plate, dish, or pan provided with a cutter pivoted at its center and made to turn around in contact with its sides and bottom, whereby the under crust or portion of the pie, cake, &c., resting thereon, may be readily separated therefrom for removal to another plate or for immediate use.

To enable others skilled in the art to understand and use my invention, I will proceed to describe the manner in which I have carried it out.

In the said drawings, A represents a circular plate, ordinarily and preferably of tin, for containing the pie or cake to be baked. Secured to the center of this plate, by means of a rivet, *a*, passing through its inner end, is a thin flat strip, *b*, also of tin, resting directly on and snugly in contact with the bottom *c* and sides *d* of the interior of the plate, the strip being bent under the plate, as seen in Fig. 2, and corresponding exactly thereto in form and serving as a cutter which may be turned around an entire revolution by applying the hand to the handle *e*, the cutter being drawn under the crust and separating it from the bottom and sides of the plate or pan, should it be found to stick or adhere thereto. The pie, cake, or loaf of bread may thus be readily removed from the baking-tin to the plate or receptacle upon which it is to be placed for eating, and as no lard or butter is employed in greasing the plate or pan, the unpleasant taste frequently arising therefrom is consequently avoided. By means of the handle *e* of the cutter, the plate A may be conveniently carried from place to place without soiling the hands. The portion of the strip *b* of tin extending under the plate from the pivot at its center to the point *h*, where the bottom and beveled side of the plate unite, see Fig. 3, may be omitted if desired without departing from the spirit of my invention.

I claim—

In combination with a bake-plate, the rotating knife *b*, substantially as and for the purpose set forth.

Witness my hand this 29th day of September, A. D. 1874.

WALTER H. MANNING.

In presence of—
 N. W. STEARNS,
 W. J. CAMBRIDGE.